United States Patent
Modarresi

(10) Patent No.: US 11,443,015 B2
(45) Date of Patent: Sep. 13, 2022

(54) GENERATING PREDICTION MODELS IN ACCORDANCE WITH ANY SPECIFIC DATA SETS

(71) Applicant: ADOBE INC., San Jose, CA (US)

(72) Inventor: Kourosh Modarresi, Los Altos, CA (US)

(73) Assignee: Adobe Inc., San Jose, CA (US)

(*) Notice: Subject to any disclaimer, the term of this patent is extended or adjusted under 35 U.S.C. 154(b) by 1118 days.

(21) Appl. No.: 14/919,395

(22) Filed: Oct. 21, 2015

(65) Prior Publication Data

US 2017/0116530 A1 Apr. 27, 2017

(51) Int. Cl.
| | |
|---|---|
| *G06F 17/18* | (2006.01) |
| *G06Q 30/02* | (2012.01) |
| *G06Q 10/06* | (2012.01) |
| *G06Q 10/04* | (2012.01) |
| *G06N 20/00* | (2019.01) |

(52) U.S. Cl.
CPC ............ *G06F 17/18* (2013.01); *G06N 20/00* (2019.01); *G06Q 10/04* (2013.01); *G06Q 10/063* (2013.01); *G06Q 10/067* (2013.01); *G06Q 30/02* (2013.01)

(58) Field of Classification Search
CPC ........ G06F 17/18; G06N 20/00; G06Q 10/04; G06Q 10/067; G06Q 10/063; G06Q 30/02
See application file for complete search history.

(56) References Cited

U.S. PATENT DOCUMENTS

| | | | | |
|---|---|---|---|---|
| 5,659,667 | A * | 8/1997 | Buescher ............ | G05B 13/027 706/23 |
| 6,928,398 | B1 * | 8/2005 | Fang ..................... | G06Q 10/06 703/2 |
| 7,054,828 | B2 * | 5/2006 | Heching ............... | G06Q 30/02 702/179 |
| 7,716,022 | B1 * | 5/2010 | Park ...................... | G06Q 10/10 702/181 |
| 7,747,641 | B2 * | 6/2010 | Kim ..................... | G06F 16/2465 707/769 |

(Continued)

OTHER PUBLICATIONS

Telecom Customer Churn Prediction Method Based on Cluster Stratified Sampling Logistic Regression Li et al. (Year: 2014).*

(Continued)

*Primary Examiner* — Eric Nilsson
*Assistant Examiner* — Ababacar Seck
(74) *Attorney, Agent, or Firm* — Shook, Hardy & Bacon L.L.P.

(57) ABSTRACT

Embodiments of the present invention provide systems, methods, and computer storage media for facilitating generation of prediction models. In some embodiments, a predetermined number of parameter value sets is identified. Each parameter value set includes a plurality of parameter values that represent corresponding parameters within a time series model. The parameter values can be selected in accordance with stratified sampling to increase a likelihood of prediction accuracy. The parameter value sets are input into a time series model to generate a prediction value in accordance with observed time series data, and the parameter value set resulting in a least amount of prediction error can be selected and used to generate a time series prediction model (ARIMA, AR, MA, ARMA) with corresponding model parameters, such as p, q, and/or k, subsequently used to predict values.

20 Claims, 6 Drawing Sheets

(56) References Cited

U.S. PATENT DOCUMENTS

| | | | | |
|---|---|---|---|---|
| 9,418,339 | B1* | 8/2016 | Leonard | G06F 17/18 |
| 10,318,874 | B1* | 6/2019 | Duncan | G06N 20/20 |
| 2002/0127529 | A1* | 9/2002 | Cassuto | G09B 5/02 |
| | | | | 434/335 |
| 2007/0299798 | A1* | 12/2007 | Suyama | G06F 17/18 |
| | | | | 706/21 |
| 2009/0292662 | A1* | 11/2009 | Ueno | G06F 17/18 |
| | | | | 706/46 |
| 2011/0208495 | A1* | 8/2011 | Yuta | G06F 17/18 |
| | | | | 703/2 |
| 2012/0330881 | A1* | 12/2012 | Jamal | G06Q 30/02 |
| | | | | 706/52 |
| 2015/0095136 | A1* | 4/2015 | Jalali | G06Q 30/0242 |
| | | | | 705/14.41 |
| 2015/0112900 | A1* | 4/2015 | Ariyoshi | G06N 20/00 |
| | | | | 706/12 |
| 2017/0068972 | A1* | 3/2017 | Jalali | G06Q 30/0202 |
| 2017/0091622 | A1* | 3/2017 | Taylor | G06F 17/18 |
| 2018/0046926 | A1* | 2/2018 | Achin | G06Q 10/04 |
| 2020/0257992 | A1* | 8/2020 | Achin | G06N 5/04 |

OTHER PUBLICATIONS

Time Series Modeling Using Markov and Arima Models Mohd Khairul Idlan Bin Muhammad (Year: 2012).*

Time series forecasting using a hybrid ARIMA and neural network model G. Peter Zhang (Year: 2003).*

How to evaluate models: Observed vs. predicted or predicted vs. observed? Pineiro et al. (Year: 2008).*

Cancer Prognosis Prediction Using Balanced Stratified Sampling Saleema et al. (Year: 2014).*

A new structure-preserving method of sampling for predicting self-similar traffic Elbiaze et al. (Year: 2009).*

Time Series Analysis of Household Electric Consumption with ARIMA and ARMA Models Chujai et al. (Year: 2013).*

Time series analysis for psychological research: examining and forecasting change Jebb et al. (Year: 2015).*

A new structure-preserving method of sampling for predicting self-similar traffic (Year: 2010).*

Methodology for long-term prediction of time series Sorjamaa et al. (Year: 2007).*

* cited by examiner

GENERATING PREDICTION MODELS IN ACCORDANCE WITH ANY SPECIFIC DATA SETS

BACKGROUND

Data analysis is frequently used to discover useable information, provide suggestions or recommendations, and support decision making in a number of environments. For example, many businesses rely on data analysis to improve performance and quality. In many cases, to improve or support decision making, predictive data analysis is used such that a business understands expected results at some point in the future. Predictive data analysis is oftentimes used in web analysis environments to predict data associated with web usage. For instance, a user may wish to understand number of page views anticipated to occur at a time in the future to ensure a web page has proper content and/or resources in place to support the anticipated page views. In any environment, accurate predictive data is valuable to ensure the entity that relies on the data is in the best position to use the data appropriately and effectively.

SUMMARY

Embodiments of the present invention relate to generating prediction models in accordance with selected data sets. Generating prediction models to align with a particular data set enables predictive data to be more accurate and, as such, reliable data for a user. In one implementation, to generate a prediction model, a predetermined number of parameter value sets is identified. Each parameter value set includes a plurality of parameter values that represent corresponding parameters within a time series model. The parameter values can be selected in accordance with stratified sampling to increase a likelihood of prediction accuracy. The parameter value sets are input into a time series model to generate a prediction value in accordance with observed time series data, and the parameter value set resulting in a least amount of prediction error can be selected and used to generate a time series prediction model (ARIMA) subsequently used to predict values.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
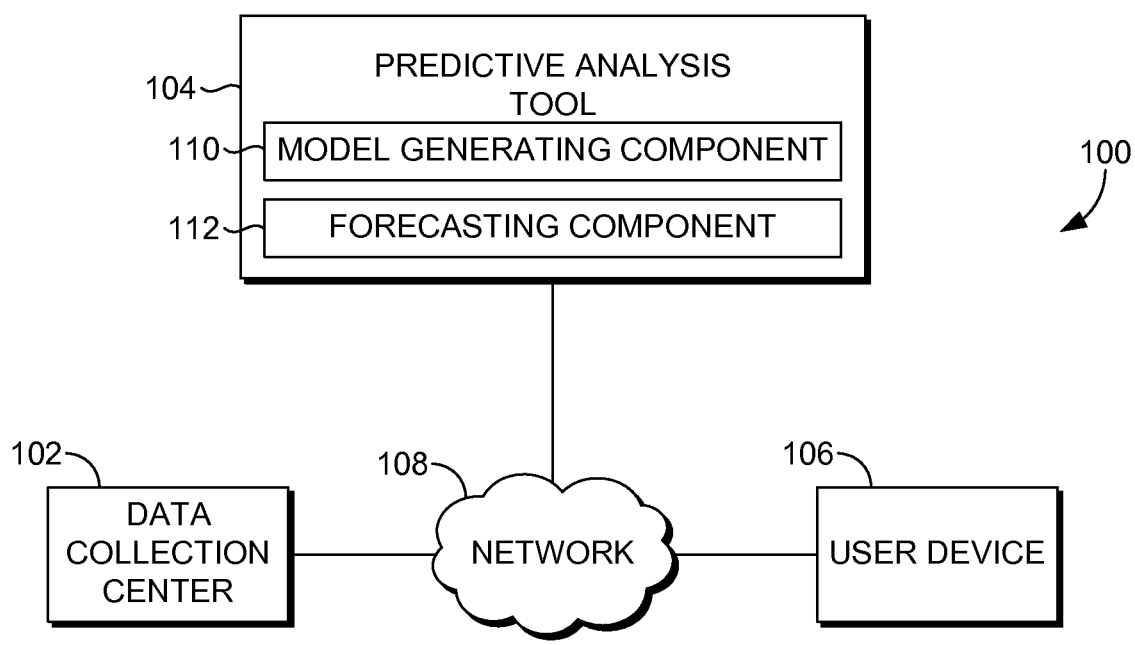
FIG. 1 is a block diagram of an exemplary system architecture in which embodiments of the invention may be employed.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Data is often collected as a time series data set, that is, a sequence of data points, typically including successive measurements made over a time interval. Time series data is frequently utilized to perform a predictive or forecasting data analysis. In this manner, time series data can be used to generate a prediction model for use in predicting or forecasting data expected to result at some point in the future. Algorithms for time series forecasting can have many forms. For example, to perform time series forecasting, various algorithms related to autoregressive (AR), moving average (MA), autoregressive moving average (ARMA), and autoregressive integrated moving average (ARIMA) can be implemented to infer prediction models from collected time series data. Such prediction models can then be used predict data associated with any number of future time intervals.

Because time series forecasting algorithms result in substantial computations to infer prediction models and predict values, many prediction models are statically generated and thereafter used across a variety of different data sets. For instance, a single prediction model generated from one set of time series data is used to predict values associated with many other data sets. Because the prediction model is not adaptive to the various data sets, the computed values may not be accurate predictors of results expected in the future. Further, prediction models are conventionally developed based on assumptions or constraints that have been made in order to generate the models. However, data oftentimes does not follow these fixed assumptions or constraints ultimately resulting in less effective predictive values.

As such, embodiments of the present invention are directed to generating prediction models adaptive to observed time series data sets that correspond with the data to be predicted. In this regard, a time series prediction model, or prediction model, is learned from a specific set of data. That is, a prediction models are adjusted to data sets by treating each data set differently and developing a specific model designed for the specific data set. In particular, a set of parameter values for the prediction model is learned using the specific set of data and leads to selection of a specific model for the data set. Because determining a set of parameter values for using in a prediction model can be computational intensive, embodiments described herein implement an efficient computation for selecting parameter values. Upon generating the prediction model having the parameter values specific to the collected data, the prediction model is used to forecast or predict values (e.g., expected number of page views) that correspond with the collected data (e.g., observed number of page views). As such, as opposed to using a single prediction model for various data sets, different models are generated and used for predicting values based on learning from a corresponding data set.

By way of example only, assume that page view data is collected for a 52 week time period. A prediction model to forecast values for the next month can be generated using the page view data captured from the prior 52 week time period. Now assume that, at a later time, another prediction of future values is desired. In such a case, a separate page view data set of a different 52 week time period may be analyzed and used to generate a new prediction model for use in predicting values.

In particular, and at a high level, to generate a prediction model having a set of parameter values, an observed data set to facilitate generating the prediction model is selected. The observed data is used select a set of parameter values for incorporating into a time series prediction model, such as an autoregressive integrated moving average (ARIMA) model. As such, the parameter values are selected in accordance with observed data and therefore intended to improve the accuracy of the prediction model. Because analyzing various parameters and parameter combinations for accuracy can be computationally extensive, embodiments described herein facilitate an efficient selection of parameter values. To this end, various parameter values are selectively analyzed to identify a set of parameter values that more accurately predict values. For instance, efficient parameter value selection may include analysis of a limited number of parameter value sets (e.g., 4) to analyze, reduction of a range of potential parameter values for each parameter, and/or utilization of parameter value sampling (e.g., stratified sampling). Further, the analyzed parameter value sets can be compared to one another to identify or select the parameter value set resulting in a more accurate prediction or a prediction with less relative error.

Upon analyzing possible parameter value sets and selecting a parameter value set resulting in a more accurate prediction or less relative prediction error, the selected parameter set can be inserted into a prediction model, such as AR, MA, ARMA, or ARIMA, and used to generate expected values. As the prediction model includes parameters generated from an observed data set and the observed data set can be used, at least in part, to generate predicted values, the accuracy of the prediction model is increased.

Various terms are used throughout this description. Although more details regarding various terms are provided throughout this description, general definitions of some terms are included below to provider a clearer understanding of the ideas disclosed herein:

A prediction model refers to any model used to predict values. Prediction models are generally described herein as time series prediction models for predicting future values based on previously observed time series data. Prediction models may be, for instance, autoregressive models, moving average models, autoregressive moving average, or autoregressive integrated moving average (ARIMA) models. Prediction models generally include parameters to define the particular model.

A parameter refers to a characteristic, feature, or factor that is used to define a function of the model. A parameter value refers to a value used to represent a parameter within a prediction model. Parameters in time series models may include an order of differences parameter (herein denoted as k) and/or number of values (herein denoted as p or q). An order of differences parameter, parameter k, refers to a parameter that indicates the number or order of differencing terms. A number of values, parameter p or q, refers to a parameter that indicates a number of previous values to use in the model. In particular, parameter p indicates the number of previous (lagged) values of metric Y (metric for which a prediction is being made), and parameter q indicates the number of lagged white noise terms used in the model.

A parameter value set refers to a set of parameter values that can be used in a prediction model. For example, a parameter value set may include parameter values that represent parameters p, q, and k.

Parameter value sampling or sampling refers to the use of a portion of the total number of possible parameter values to sample. Sampling can be used to enable a more efficient selection of appropriate parameter values and reduce the number of choices or computations performed to identify parameter values. With stratified sampling, a population (e.g., set of potential values for a parameter) is divided into different subgroups or strata and, thereafter, samples are randomly selected proportionally from the different strata in accordance with respective probabilities. As such, stratified sampling can be used to increase the likelihood of parameter values being selected that are more likely to result in an accurate prediction.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as system 100. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 100 may include a data collection center 102, a predictive analysis tool 104, and a user device 106. It should be understood that the system 100 shown in FIG. 1 is an example of one suitable computing system architecture. Each of the components shown in FIG. 1 may be implemented via any type of computing device, such as computing device 600 described with reference to FIG. 6, for example. The components may communicate with each other via a network 108, which may include, without limitation, one or more local area networks (LANs) and/or wide area networks (WANs). Such networking environments are commonplace in offices, enterprise-wide computer networks, intranets, and the Internet.

It should be understood that any number of data collection centers, predictive analysis tools, and user devices may be employed within the system 100 within the scope of the present invention. Each may comprise a single device or multiple devices cooperating in a distributed environment.

For instance, the predictive analysis tool 104 may be provided via multiple devices arranged in a distributed environment that collectively provide the functionality described herein. As another example, multiple data collection centers 102 may exist, for instance, to be located in remote locations, to increase storage capacity, or to correspond with distinct information (e.g., a separate data collection center for separate websites). Additionally, other components not shown may also be included within the network environment.

The data collection center 102 is generally configured to collect observed data. The data collection center 102 may collect data from any number of data sources and any type of data sources. In some cases, the data sources generally include any online presence at which website usage occurs or can be detected. In such cases, the data collection center 102 may access data from a web server(s) providing a website(s) and/or from a client device(s) at which a website(s) is being browsed or navigated. As can be understood, the data collection center 102 can contain any amount of numerical data including raw or processed data. The collected data is stored in a storage area, such as a database, for reference by the predictive analysis tool 104. Any and all such variations of data sources and data associated with the data collection center 102 are contemplated to be within the scope of embodiments of the present invention.

In accordance with embodiments described herein, the data collection center 102 can collect time series data. Time series data generally refers to data captured as a sequence of data points, typically including successive measurements made over a time interval. Time series data can be captured in any number of manners, in any type of format, and in association with any time periods.

Embodiments described herein generally refer to collecting time series data related to web usage. In this regard, a variety of web data can be measured including the type of browser being used, links selected on a particular web page, conversions, etc. By way of example only, and with reference to FIG. 2 a data collection center associated with a prediction analysis tool (not shown) is used to collect a large amount of web data available via the World Wide Web, which may include any number of web services or sites. The amount of data available is extremely large, and it may be impractical or burdensome for the website provider to collect and/or analyze such data. As such, a data collection center associated with a predictive analysis tool can collect web site visitors' online analytics data such as page views and visits that are relevant to a web site(s).

Such a large amount of web data results, in part, from the numerous data sources providing web data. With continued reference to FIG. 2, in one embodiment, each of the data sources 202A, 202B, and 202X provide a data collection center 204 with data describing web traffic. Each of data sources 202A, 202B, and 202X is a data source, such as a web server or a client device, capable of providing data associated with website usage, for example, via a network 212. For instance, data source 202A might be a web server associated with a website, data source 202B might be a web server associated with the website, and data source 202X might be a client device being used to navigate the website via a browser.

Figure 2:
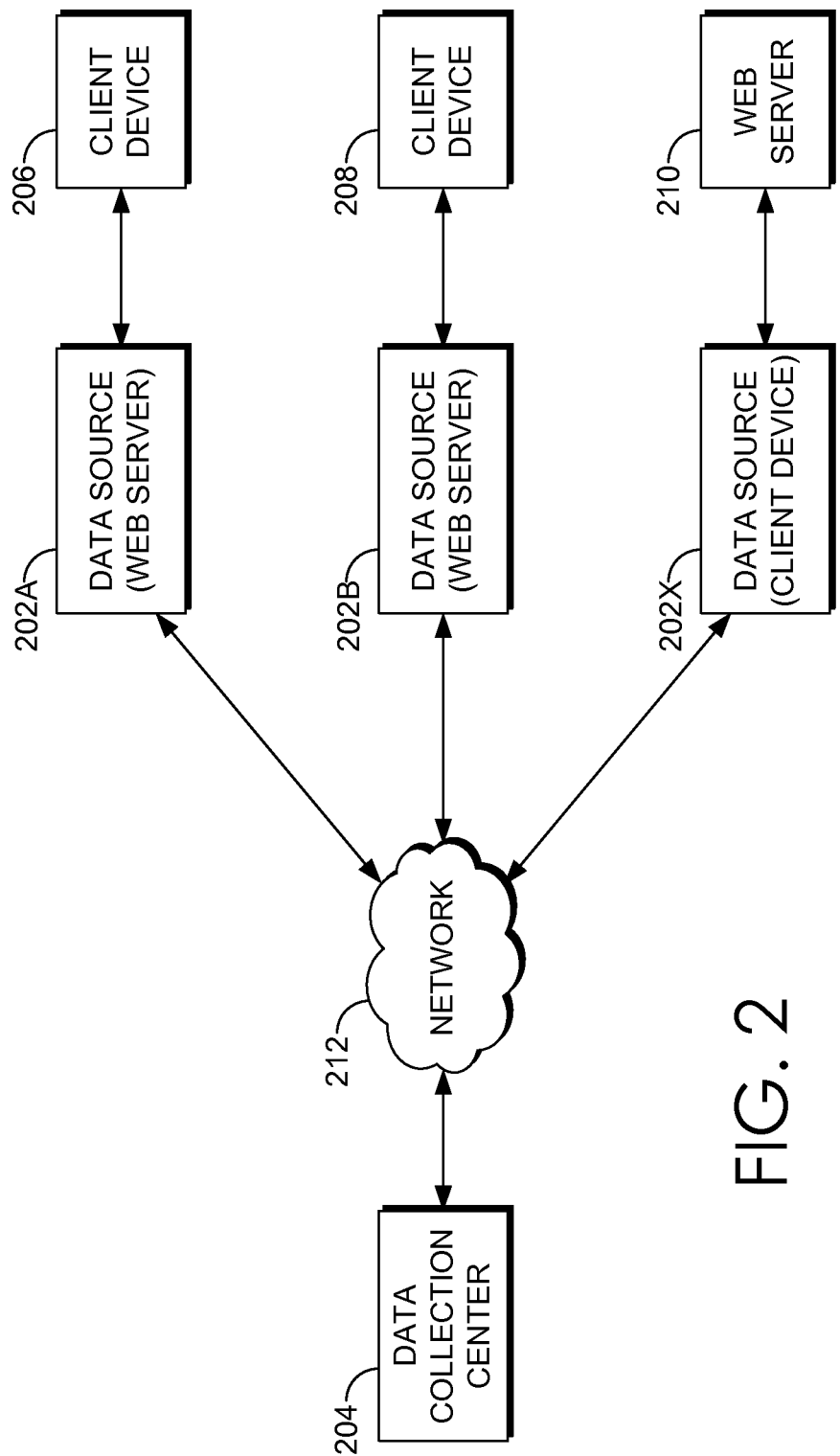
FIG. 2 is a block diagram of an exemplary data collection environment suitable for use in implementing embodiments of the present invention

As illustrated in FIG. 2, data source 202A and data source 202B can obtain web data based on interactions with the respective client devices 206 and 208. In this regard, the browsers of the client devices can request web pages from the corresponding web servers and, in response, the web servers return the appropriate HTML page to the requesting client devices. Web data detected from navigations of the corresponding web pages at client devices 206 and 208 can be obtained at the web servers 202A and 202B and provided to the data collection center 204 via the network 212. By comparison, data source 202X can be a client device having a browser that requests a web page from a web server 210. The web server 210 can return to the client device 202X the appropriate HTML page with code (e.g., JavaScript code) that triggers communication of the web data to the data collection center 204 via the network 212.

Although FIG. 2 illustrates data sources as including both web servers and client devices, in some embodiments, such data sources might be solely web servers or solely client devices. Further, as can be appreciated, the web data provided to the data collection center 204 from the data sources can be associated with any number of web sites. For instance, in some cases, each of the data sources might provide data associated with a single web site (e.g., various clients navigating a particular web site). In other cases, the data sources might provide web data associated with multiple web sites (e.g., web servers associated with various web sites).

While FIG. 2 is generally described herein in reference to a web analytics environment, data collection may occur in any number of environments including any other web or non-web related environment. Irrespective of the environment, the data collection center 204 can collect data from any number of data sources and in any manner.

Returning to FIG. 1, the predictive analysis tool 104 is configured to generate prediction models and utilize the prediction models to predict values, as described in more detail below. Although the predictive analysis tool 104 is shown as a separate component, as can be understood, the predictive analysis tool 104, or a portion thereof, can be integrated with another component, such as a data collection center, user device, web server, or the like. For instance, in one embodiment, the predictive analysis tool 104 is implemented as part of a web analysis server or other component specifically designed for web analysis. In another embodiment, the predictive analysis tool 104 is implemented as part of a web server or other hardware or software component, or it can be implemented as a software module running on a conventional personal computer, for example, that is being used for web analysis.

The predictive analysis tool 104 can perform prediction model generation and/or determine predictive values in real-time (e.g., as data is recorded at the data collection center), in a batch methodology (e.g., upon a lapse of a time duration), or upon demand when a request is made for predictive model generation or for predictive values. By way of example only, in some cases, the predictive analysis tool 104 automatically initiates predictive model generation and/or data forecasting, for instance, based on expiration of a time duration, upon recognition of new data, or the like. As another example, a user operating the user device 106 might initiate predictive model generation and/or data forecasting, either directly or indirectly. For instance, a user may select to predict data within a time period to directly initiate prediction model generation and/or predictive value determination. Alternatively, a user may select to view a predictive data analysis, for example, associated with website usage, thereby triggering the predictive analysis tool to perform prediction model generation and/or predictive values.

As shown in FIG. 1, the predictive analysis tool 104 includes, among other things not shown, a model generation component 110 and a forecasting component 112. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The model generation component 110 is configured to generate prediction models. Prediction models can be generated using collected data. As such, the model generation component 110 can operate to reference data, for example, from the data collection center 102. Data can be referenced in any manner including, receiving the data, retrieving the data, or otherwise accessing the data. Further, any amount of data can be referenced. For example, in some cases, all of the data within the data collection center 102 might be referenced. In other cases, a portion of the data within the data collection center 102 might be referenced, such as data associated with a particular entity, service, or website; data collected since a previous data analysis was performed; data collected or corresponding with a particular time frame; or the like. Again, although the data collection center 102 is illustrated as remote from the predictive analysis tool 104, such stored data can be integrated or directly accessible from the predictive analysis tool 104 (e.g., via a direct connection).

Generally, the referenced data is represented as a data set in the form of time series data. Based on a metric, type, and/or time period associated with expected data values, a particular data set can be identified and used to generate a corresponding prediction model. A particular data set might be referenced based on an interest of an expected value. For example, assume a user is interested in page views for the next week. In such a case, page view data associated with the previous 52 weeks can be obtained as a data set.

The selected data set can be used by the model generation component 110 to identify parameter values for a prediction model. As described, a prediction model refers to any model used to predict values. Prediction models are generally described herein as time series prediction models for predicting future values based on previously observed time series data. Prediction models generally include parameters to define the particular model. A parameter refers to a characteristic, feature, or factor that is used to define a function of the model. A parameter value refers to a value used to represent a parameter within a prediction model. Parameters in time series models may include an order of differences parameter (herein denoted as k) and/or number of values (herein denoted as p or q). An order of differences parameter, parameter k, refers to a parameter that indicates the number or order of differencing terms. Stated differently, parameter k is the degree of differencing. A number of values, parameter p or q, refers to a parameter that indicates a number of previous values to use in the model. In particular, parameter p indicates the number of previous (lagged) values of metric Y (metric for which a prediction is being made), and parameter q indicates the number of lagged white noise terms used in the model. In other words, p is the order of the autoregressive model, and q is the order of the moving-average model, both models being described more fully below.

Such parameters are used in various prediction models. For example, an autoregressive integrated moving average model (ARIMA) utilizes each of p, q, and k parameters, as indicated in the below ARIMA model:

$$Y^*_{(t)} = a + A_{(1)}Y^*_{(t-1)} + \ldots + A_{(p)}Y^*_{(t-p)} + M_{(1)}E_{(t-1)} + \ldots + M_{(q)}E_{(t-q)} + E_{(t)}$$

wherein Y refers to the metric for which a prediction is being made (e.g., number of page views), k indicates the number (order) of difference terms, p indicates the number of previous (lagged) values of metric (Y), and q indicates the number of lagged white noise terms E used in the model. The ARIMA model is generally formed from combinations of aspects of the autoregressive (AR) models, the integrated (I) feature models, and the moving average (MA) models, which depend linearly on previous data points.

As another example, an autoregressive-based model utilizes the parameter p, as indicated in the below model:

$$Y_{(t)} = b + A_{(0)} + A_{(1)}Y_{(t-1)} + \ldots + A_{(p)}Y_{(t-p)} + e_{(t)}$$

wherein, Y refers to the metric for which a prediction is being made (e.g., number of page views), and parameter p indicates the number of previous (lagged) values of the metric. Further, b refers to a constant and e refers to white noise. Parameter p generally indicates a final point at which the model should analyze input (e.g., analyze data from t to t–p). Autoregressive-based models are generally used when the data shows dependence to its own past values without a long run average or any significant independent noise components. With autoregression models, the data at any point is very correlated to the previous point. As such, the most relevant point in predicting values using autoregression models is the present point in time (t) followed by the previous point (t–1), and so on.

Another model, the moving average model, utilizes the parameter q, as indicated the below model:

$$T_{(t)} = E_{(0)}u + M_{(1)}E_{(t-1)} + \ldots + M_{(q)}E_{(t-q)} + E_{(t)}$$

wherein, Y refers to the metric for which a prediction is being made (e.g., number of page views), q is the number of the lagged white noise terms (E) used in the model (e.g., to get an accurate prediction), and u refers to long run (mean of all X's) average. Moving average models are generally used when the data includes white noise around a moving average that is an extended trend.

The autoregressive moving average (ARMA) model utilizes the parameter p, as indicated in the below model:

$$Y_{(t)} = a + A_{(1)}Y_{(t-1)} + \ldots + A_{(p)}Y_{(t-p)} + M_{(1)}E_{(t-1)} + \ldots + M_{(q)}E_{(t-q)} + E_{(t)}$$

Integrated models utilize the parameter k, as indicated in the ARIMA model. The impact of the integrating factor when applied to, as an example, auto-regressive-based model, is illustrated in the below model:

$$Y^*_{(t)} = b + A_{(0)} + A_{(1)}Y^*_{(t-1)} + \ldots + A_{(p)}Y^*_{(t-p)}$$

wherein, Y refers to the metric for which a prediction is being made (e.g., number of page views), parameter k indicates the number (order) of differencing terms, e indicates white noise, and parameter p indicates the number of previous (lagged) values of the metric (Y). Integrated models are generally used when the data is not stationary and, as such, an integrating factor is used to make the data stationary.

To select parameter values (p, q, and k) for use in a prediction model to predict values, multiple values may be analyzed to determine which parameter values result in an accurate prediction or minimal prediction error rate. To facilitate an efficient selection of parameter values, embodiments described herein contemplate selectively analyzing various parameters to identify a set of parameter values that more accurately predict values. Various embodiments described herein to efficiently select parameter values include analysis of a limited set of parameter values, reduction of range of potential parameter values for each parameter, and/or utilization of parameter value sampling, which are described in more detail below. An efficient selection of parameter values (e.g., p, q, and k) can occur in any number of ways and is not limited to embodiments described herein.

Because analyzing numerous parameter values and parameter value combinations can be computationally time consuming, in some embodiments, a limited number of parameter value sets may be initially selected in order to identify a set of parameter values for use in a prediction model. As such, as opposed to analyzing all or numerous combinations of parameters, a limited number of parameter sets may be selected for analyzing. A parameter value set refers to a set of parameter values, such as parameters p, q, and k, that can be input as a combination in a prediction model, for example, to assess accuracy of the prediction model in accordance with the parameter values. In some cases, a predetermined number of parameter value sets may be initially selected. For example, a number of four parameter value sets may be initially selected and analyzed to identify prediction error. In such a case, if the prediction error resulting from at least one parameter value set is within an error threshold value, such as 10%, no further parameter sets need to be analyzed. However, when prediction error resulting from each of the parameter value sets exceeds such an error threshold, another analysis iteration or set of iterations of parameter value sets can be applied to identify and analyze other parameter sets.

In addition to or in the alternative to reducing the number of parameter value sets analyzed, the range of potential parameter values for each parameter can be reduced. Generally, parameter values can be selected from a range of potential parameter values for each parameter. To facilitate the selection of various parameter values, value constraints can be used to reduce the number of potential values for each parameter. A value constraint refers to a constraint or range that is to be used when selecting a value for parameter. For example, assume that a parameter value for a parameter p, indicating a number of previous (lagged values of metric (Y), can be any number between 0 and 1000. However, because more recent time series data values tend to be more effective in predicting future data, the potential parameter values for p may be limited to a range of 0 to 15 (e.g., the probability larger than 15 is nearly 0). Similarly, assume that a parameter value for a parameter q, indicating a number of lagged white noise terms used in the model, can be any number between 0 and 1000. Again, because more recent time series data value tend to be more effective in predicting future data, the potential parameter values for q may be limited to a range from 0 to 10 (e.g., the probability larger than 10 is nearly 0). As another example, a parameter value for a parameter k might be constrained or limited to a range of 1 to 4. Such constraints or value ranges may be identified in any number of ways. For example, in some cases, the constraints are determined based on analysis of collected observed data to determine probabilities of accurate parameter values associated with each of the parameters. For instance, in some cases, the distribution of the previous selected parameters (for previous prediction models) is used to compute the probabilities of each possible value for parameters p, q and k and, thus, the computation of the parameters for the current model is based on a value set with the highest probabilities by ignoring the values with small (close to zero) probabilities. Such a constrained and small value sets can change in time as more data sets are used and more observed modeling parameters, and distributions can update the value sets of the highest probabilities for the current data sets modeling.

Parameter value sampling can additionally or alternatively be implemented to facilitate the selection of parameter values for each parameter value set. Parameter value sampling refers to the use of a portion of the total number of possible parameter values to sample for parameter values. Sampling can be used to enable a more efficient selection of appropriate parameter values and reduce the number of choices or computations performed to identify parameter values. Sampling of any form may be used, such as random sampling or stratified sampling. With random sampling, samples are randomly selected with each having a uniform chance of being selected. With stratified sampling, a population (e.g., set of potential values for a parameter) is divided into different subgroups or strata and, thereafter, samples are randomly selected proportionally from the different strata in accordance with respective probabilities. As such, stratified sampling can be used to increase the likelihood of parameter values being selected that are more likely to result in an accurate prediction. Because more current time series values can enable a more accurate prediction, stratified sampling, can be used to perform a more exhaustive search of values closer to time t.

By way of example and without limitation, assume potential values for parameter p include 0 to 15, potential values for parameter q include 0 to 10, and potential values for parameter k include 1 to 4. In such a case, Table 1 below illustrates various example strata and corresponding probabilities for each parameter.

TABLE 1

Exemplary Strata and Corresponding Probabilities of Parameters

| | $1^{st}$ Strata | $2^{nd}$ Strata | $3^{rd}$ Strata | Strata Probabilities (P) |
| --- | --- | --- | --- | --- |
| Parameter p | 0-5 | 6-10 | 11-15 | $1^{st}$ Strata (P)-8/16 |
| | | | | $2^{nd}$ Strata (P)-5/16 |
| | | | | $3^{rd}$ Strata (P)-3/16 |
| Parameter q | 0-5 | 6-10 | — | $1^{st}$ Strata (P)-7/11 |
| | | | | $2^{nd}$ Strata (P)-4/11 |
| Parameter k | 1-2 | 3-4 | — | $1^{st}$ Strata (P)-3/4 |
| | | | | $2^{nd}$ Strata (P)-1/4 |

In this example, assume that four initial parameter value sets are to be selected to determine if any such value set is to be used in generating a prediction model. In such a case, the values for each parameter can be selected in accordance with the corresponding probabilities. In this way, for instance, when selecting a parameter value for p, there is a higher probability that the value selected will be between 0 and 5. Four parameter value sets {p, q, k} that might be selected in accordance with the selected strata and corresponding probabilities may include, for example, {4, 2, 1}, {6, 8, 1}, {14, 3, 4}, and {3, 5, 2}. As such, parameters can be identified using stratified sampling probabilities and based on least squared error criterion. Such parameter identification can be performed using a first portion of observed data (e.g., 80% of total data set).

Upon identifying parameter sets to assess prediction accuracy, each identified parameter set can be input or plugged into a prediction model, such as an ARIMA model, to perform validation of the parameters. In determining accuracy or relative error of a parameter value set, a prediction model with the parameter values can be used with a portion of the collected or observed data (e.g., a second portion, for instance, including a remaining 20% of the data set) to compute predictive values for a certain date range for which data has already been collected. The predictive values can then be compared to the already collected data values (e.g., of the second portion) for that data range to understand accuracy or relative error associated with the parameter values. The relative may be computed as: Euclidean-Norm (predicted values-actual values)/Euclidean-Norm (actual values). By way of example, and without limitation, assume that 100 page view data values have been observed. In such a case, 80 of those values can be used in association with the prediction model having a parameter value set to determine 20 values. The predicted 20 values can then be compared to the remaining 20 observed values to determine an error rate. This process can be applied for each parameter set to identify an accuracy or relative error associated with each parameter set.

Upon determining the accuracy or relative error associated with each parameter set, or corresponding model, the parameter set associated with the most accurate results, or the least relative error, can be selected as the parameter value set from which to generate the prediction model. In some cases, when none of the accuracy levels or error rates meet expectations (e.g., do not meet or exceed a threshold), an additional parameter value set(s) may be selected and evaluated until a parameter value set is determined to have a qualified accuracy.

By way of example only, assume four initial parameter value sets identified as potential parameter values include: {4, 2, 1}, {6, 8, 1}, {14, 3, 4}, and {3, 5, 2}. Each parameter value set can be plugged into an ARIMA model to fulfill the values of p, q, and k in the ARIMA model. Assume that 100 page view data values have been observed. A portion of the observed values, for instance, 80 observed values can be used in association with the ARIMA model to compute the first parameter set of {4, 2, 1}, which in turn, by using it in ARIMA model, could identify 20 predicted values. The 20 predicted values are compared to the corresponding 20 observed data values to determine a relative error associated with the first parameter set, or first ARIMA model. Similarly, the 80 observed values can be used in association with the ARIMA model to compute the second parameter set of {6, 8, 1} to generate a second set of predicted values, the ARIMA model having the third parameter set of {14, 3, 4} to generate a third set of predicted values, and the ARIMA model having the fourth parameter set of {3, 5, 2} to generate a fourth set of predicted values. Each of the predicted value sets can then be compared to the corresponding 20 observed data values to determine a relative error associated with the second parameter set, a relative error associated with the third parameter set, and a relative error associated with the fourth parameter set. Assume that the first parameter set results in a 20% relative error, the second parameter set results in a 22% error, the third parameter set results in a 12% error, and the fourth parameter set results in a 3% error. In such a case, because the fourth parameter set results in an error less than an error threshold of 10%, the fourth parameter set is selected for use in a prediction model. If none of the parameter sets resulted in an error below the defined threshold, the number of iterations might be increased to select an additional parameter set(s).

A prediction model is generated based on the selected parameter value set, that is, the parameter value set resulting the most accurate predictions. In some cases, the selected parameter value set is used in connection with the ARIMA model to generate the prediction model. In other cases, when a parameter value(s) within the selected parameter value set equals zero, another model may be supplemented with the parameter values to generate the prediction model for use in predicting values. In this regard, selecting p, q, and k effectively selects a model (e.g., AR, MA, ARMA or ARIMA). As an example, if k and q are determined to equal zero, then the AR(p) model has effectively been selected. As another example, if k is determined to be zero, then the ARMA(p,q) model has been effectively selected.

The forecasting component 112 is generally configured to use the generated prediction model to predict or forecast data. In this manner, the forecasting component uses a prediction model with the selected parameters (e.g., p, q, and/or k) to predict values. As described, the parameter values selected for the prediction model can be based on the specific data set used (e.g., at least in part) to predict values. Selecting parameter values specific to the data set can enable a more accurate prediction of values. By way of example only, assume a set of 100 data values are observed prior to time t. Now assume that 80 of those 100 observed data values are used to select parameter values for p, q, and k to equal 2, 6, and 1, as described above with reference to the model generating component 110. The selected parameter values of 2, 6, and 1 can be applied to the ARIMA model in association with the observed data values (e.g., 100 observed data values or 80 observed data values) to predict data values beginning at time t.

In some cases, all parts of a data set are used for either modeling or cross validation in such way that in one iteration (of the same dataset) the first 80 points, for example, may be used for parameter selection and the final 20 points for cross validation (testing the accuracy of the model). In the next iteration it may be that, for example, the last 80 points are chosen for the modeling part and the first 20 points are used for accuracy determination (testing). The selection of which 80 data points (and also which 20 points) are chosen for parameter selection (or testing) can be performed as a random (uniform random) selection.

Aspects of both the model generating component 110 and forecasting component 112 can be performed in real-time such that a prediction model is generated in accordance with a specific data set and then applied to generate expected values.

Figure 3:
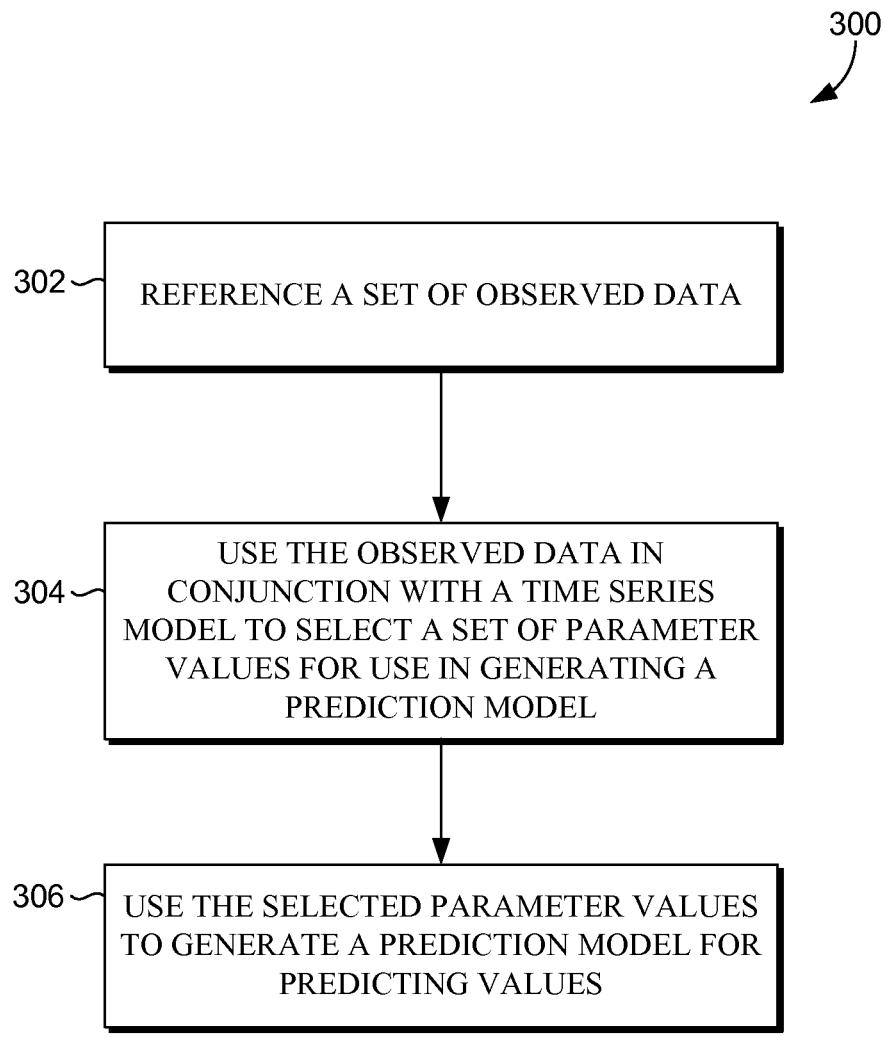
FIG. 3 is a flow diagram showing a method for facilitating generation of prediction models in accordance with an embodiment of the present invention.

Turning now to FIG. 3, a flow diagram is provided that illustrates a method 300 for facilitating generation of time series models. Such a method may be employed, for example, by a model generating component, such as model generating component 110 of FIG. 1. Initially, as shown at block 302, a set of observed data is referenced. Thereafter, at block 304, the observed data is used in conjunction with a time series model, such as ARIMA, to select a set of parameter values for use in generating a prediction model. At block 306, the selected parameters are used to generate a prediction model for predicting values. In this regard, the selected parameters can be used along with the observed data, or portion thereof, to predict values expected to occur at some point in the future.

Figure 4:
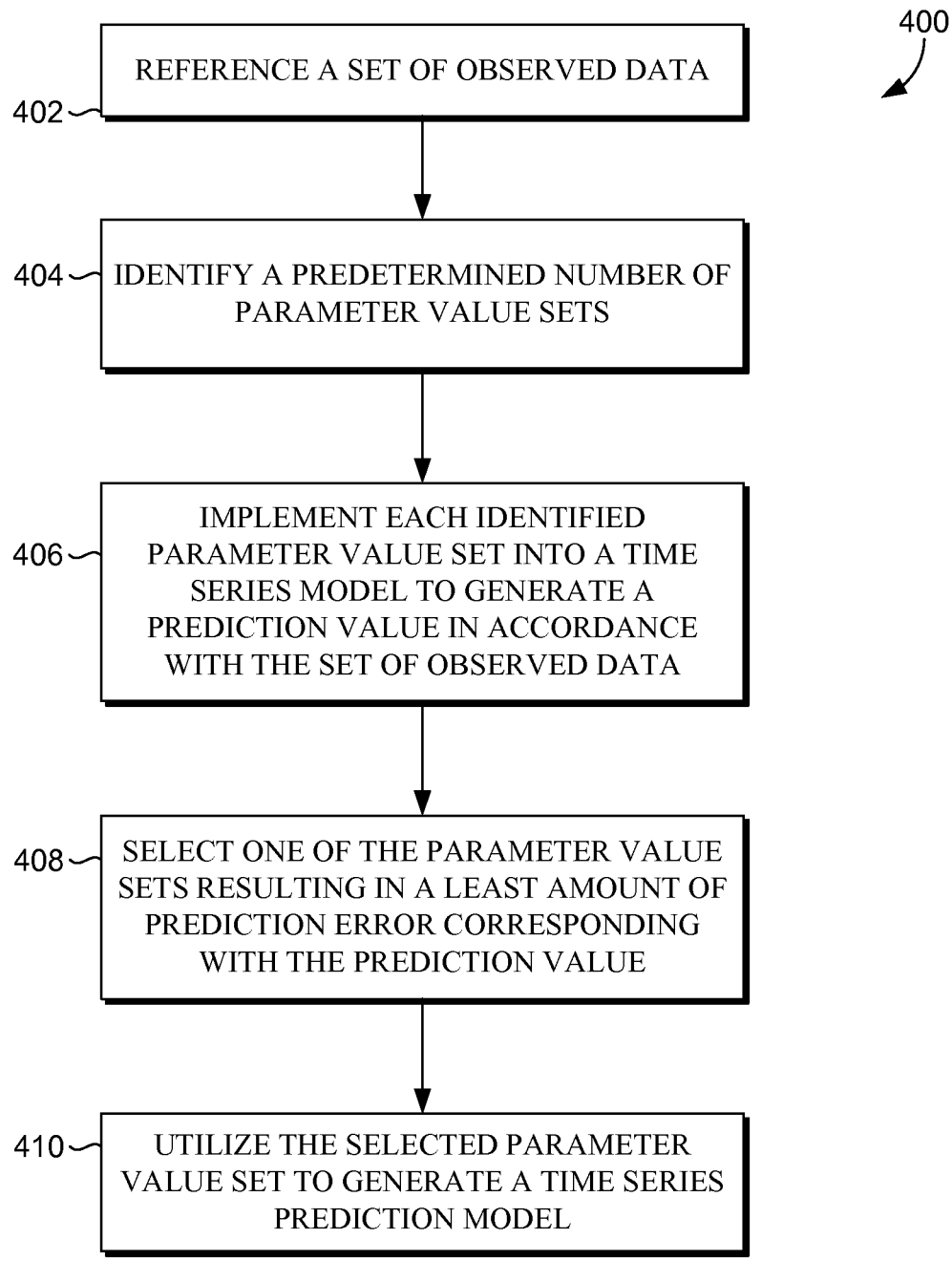
FIG. 4 is a flow diagram showing another method for facilitating generation of prediction models in accordance with an embodiment of the present invention.

Turning now to FIG. 4, a flow diagram is provided that illustrates a method 400 for facilitating generation of time series models. Such a method may be employed, for example, by a model generating component, such as model generating component 110 of FIG. 1. Initially, at block 402, a set of observed data is referenced. At block 404, a predetermined number of parameter value sets are identified. The parameter value sets include a plurality of parameter values that represent corresponding parameters within a time series model, such as ARIMA. At block 406, each identified parameter value set is implemented into the time series model to generate a prediction value in accordance with the set of observed data. Thereafter, at block 408, one of the parameter value sets resulting in a least amount of prediction error corresponding with the prediction value is selected. The selected parameter value set is utilized to generate a time series prediction model, as indicated at block 410, that is subsequently used to predict values.

Figure 5:
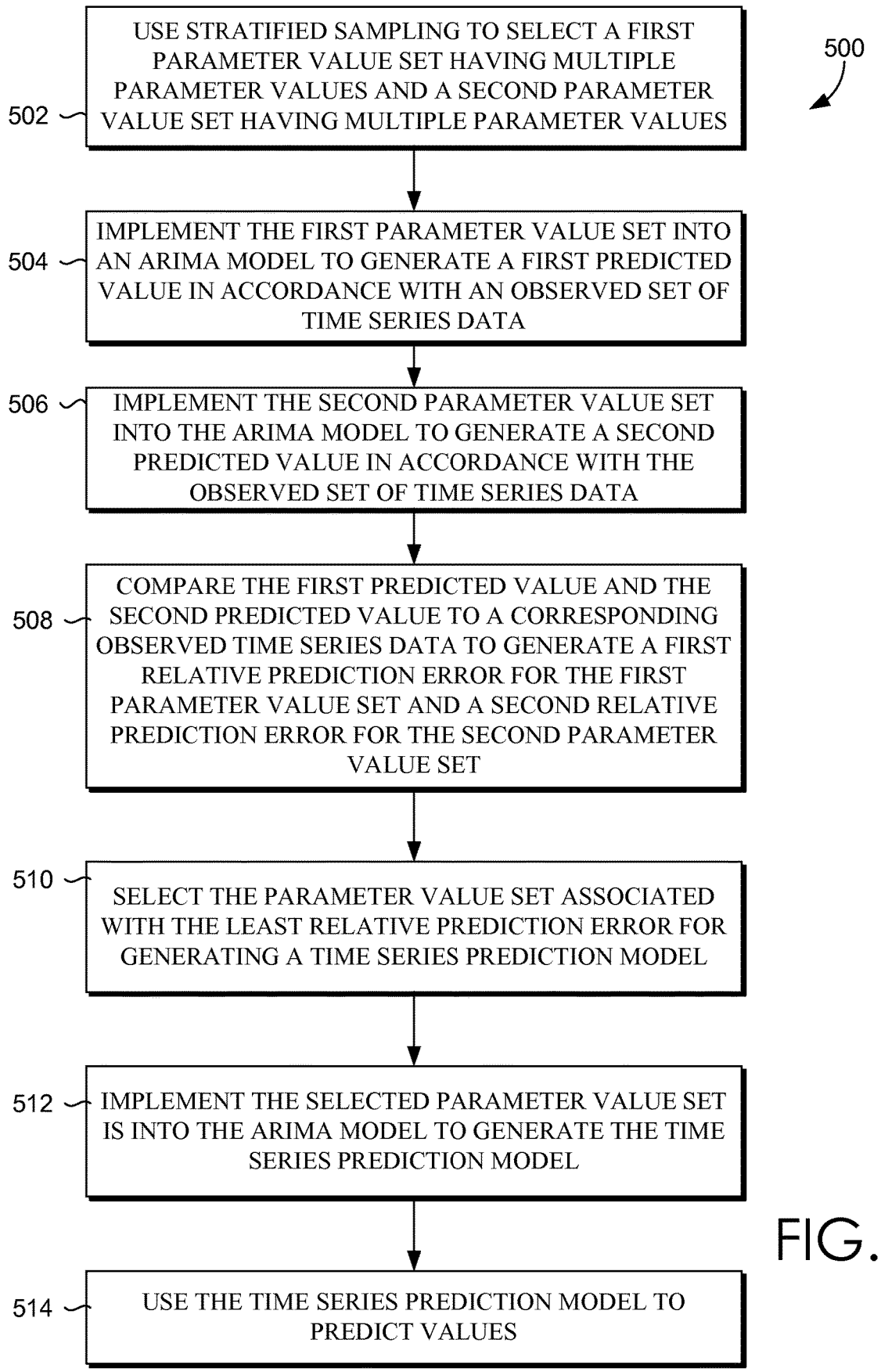
FIG. 5 is a flow diagram showing another method for facilitating generation of prediction models in accordance with an embodiment of the present invention.

With reference now to FIG. 5, a flow diagram is provided that illustrates a method 500 for facilitating predictive model generation, in accordance with embodiments described herein. Such a method may be employed, for example, by a model generating component, such as model generating component 110 of FIG. 1. Initially, as indicated at block 502, stratified sampling is used to select a first parameter value set having multiple parameter values corresponding to parameters within an autoregressive integrated moving average (ARIMA) model and to select a second parameter value set having multiple parameter values corresponding to parameters within the ARIMA model. At block 504, the first parameter value set is implemented into the ARIMA model to generate a first predicted value in accordance with an observed set of time series data. At block 506, the second parameter value set is implemented into the ARIMA model to generate a second predicted value in accordance with the observed set of time series data. Thereafter, at block 508, the first predicted value and the second predicted value are compared to a corresponding observed time series data to generate a first relative prediction error for the first parameter value set and a second relative prediction error for the second parameter value set. At block 510, the parameter value set associated with the least relative prediction error is selected for generating a time series prediction model. In some embodiments, if the least relative prediction error is not below a threshold value (e.g., 10%), a new parameter value set may be identified and applied until a relative prediction error falls below the threshold value. At block 512, the selected parameter value set is implemented into the ARIMA model to generate the time series prediction model. Subsequently, at block 514, the time series prediction model to predict values.

Figure 6:
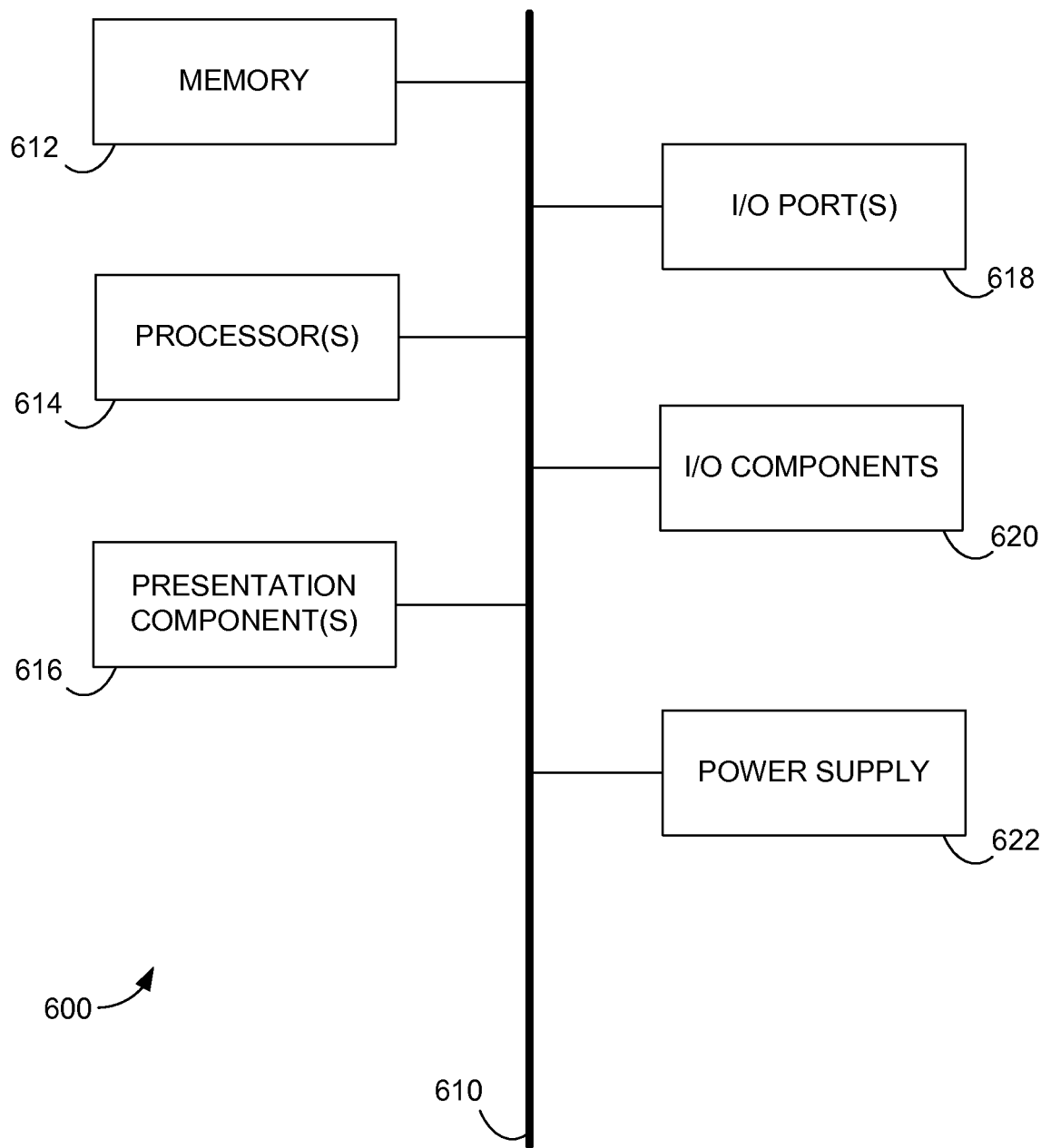
FIG. 6 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, embodiments of the present invention provide for, among other things, generating predictive models. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more non-transitory computer storage media storing computer-useable instructions that, when used by one or more computing devices, cause the one or more computing devices to perform operations to facilitate generation of prediction models, the method comprising:
    identifying a predetermined number of parameter value sets, each parameter value set having parameter values that represent corresponding parameters for inputting as a combination to define a function in an autoregressive integrated moving average (ARIMA) prediction model, wherein the parameter values indicate one of a number of differencing terms or an order of differencing terms to use in the corresponding function of the ARIMA predication model, and an indication of a previous number of web page views, each parameter value within each parameter value set is selected by:
    selecting a value from one of a plurality of strata, for a corresponding parameter, based on probabilities associated with each strata of the plurality of strata for the corresponding parameter, wherein each strata of the plurality of strata for the corresponding parameter includes a subportion of a plurality of potential parameter values for the corresponding parameter and the strata is associated with a corresponding probability, used to select the value, determined based on a distribution of previously selected parameter values for previous prediction models;
    receiving a first portion of the observed time series data set from a data collection center with data describing web traffic;
    in a first iteration, implementing each identified parameter value set into the corresponding ARIMA prediction model and use the first portion of the observed time series data set to generate a predicted value associated with each parameter value set;
    comparing the predicted value associated with each parameter value set to a second portion of the observed time series data set that corresponds with the predicted value to generate a first relative prediction error for each parameter value set, wherein the first portion does not overlap with the second portion;
    in a second iteration, implementing each identified parameter value set into the corresponding ARIMA prediction model and use a third portion of the observed time series data set to generate a new predicted value associated with each parameter value set, wherein the third portion partially overlaps with the second portion;
    comparing the new predicted value associated with each parameter value set to a fourth portion of the observed time series data set that corresponds with the predicted value to generate a second relative prediction error for each parameter value set, wherein the fourth portion does not overlap with the third portion;
    selecting a parameter value set associated with a least relative prediction error, from the first and the second relative prediction errors for each parameter value set, for generating a time series prediction model;
    implementing the selected parameter value set into the ARIMA prediction model to generate the time series prediction model; and
    using the time series prediction model to predict values expected to occur at a later time.

2. The one or more computer storage media of claim 1, wherein each parameter value within each parameter value set is selected in accordance with a given range of parameter values for each parameter, the given range including the plurality of potential parameter values for the corresponding parameter selected based on recent time series data of the observed time series data set, wherein a first given range for an order of differences is less than a second given range for the previous number of web page views.

3. The one or more computer storage media of claim 1, wherein the generation of the time series prediction model is initiated based on a request for one or more prediction values.

4. The one or more computer storage media of claim 1, wherein the parameters within the time series prediction model further comprise a number of differencing terms and a number of lagged white noise terms.

5. The one or more computer storage media of claim 1, wherein the time series prediction model comprises an autoregressive integrated moving average (ARIMA) model.

6. The one or more computer storage media of claim 1, the method further comprising:
selecting a portion of the plurality of potential parameter values based on a predetermined number of recent observed time series data values of a set of observed time series data;
for each parameter, dividing the portion of the plurality of potential parameter values into the plurality of strata, wherein each strata of the plurality of strata includes the subportion of the portion of the plurality of potential parameter values; and
assigning the corresponding probability to each strata.

7. The one or more computer storage media of claim 1, wherein selecting the parameter value set associated with the least relative of prediction error comprises comparing the prediction value with a corresponding observed time series data.

8. The one or more computer storage media of claim 1, wherein the ARIMA predication model utilizes each of p, q, and k parameters.

9. The one or more computer storage media of claim 8, wherein the q parameter indicates a number of lagged white noise terms.

10. A method to facilitate generation of prediction models, the method comprising:
identifying a predetermined number of parameter value sets, each parameter value set having parameter values that represent corresponding parameters for inputting as a combination to define a function in an autoregressive integrated moving average (ARIMA) prediction model, wherein the parameter values indicate one of a number of differencing terms or an order of differencing terms to use in the corresponding function of the ARIMA predication model, and an indication of a previous number of web page views, each parameter value within each parameter value set is selected by:
selecting a value from one of a plurality of strata, for a corresponding parameter, based on probabilities associated with each strata of the plurality of strata for the corresponding parameter, wherein each strata of the plurality of strata for the corresponding parameter includes a subportion of a plurality of potential parameter values for the corresponding parameter and the strata is associated with a corresponding probability, used to select the value, determined based on a distribution of previously selected parameter values for previous prediction models;
receiving a first portion of the observed time series data set from a data collection center with data describing web traffic;
in a first iteration, implementing each identified parameter value set into the corresponding ARIMA prediction model and use the first portion of the observed time series data set to generate a predicted value associated with each parameter value set;
comparing the predicted value associated with each parameter value set to a second portion of the observed time series data set that corresponds with the predicted value to generate a first relative prediction error for each parameter value set, wherein the first portion does not overlap with the second portion;
in a second iteration, implementing each identified parameter value set into the corresponding ARIMA prediction model and use a third portion of the observed time series data set to generate a new predicted value associated with each parameter value set, wherein the third portion partially overlaps with the second portion;
comparing the new predicted value associated with each parameter value set to a fourth portion of the observed time series data set that corresponds with the predicted value to generate a second relative prediction error for each parameter value set, wherein the fourth portion does not overlap with the third portion;
selecting a parameter value set associated with a least relative prediction error, from the first and the second relative prediction errors for each parameter value set, for generating a time series prediction model;
implementing the selected parameter value set into the ARIMA prediction model to generate the time series prediction model; and
using the time series prediction model to predict values expected to occur at a later time.

11. The method of claim 10, wherein each parameter value within each parameter value set is selected in accordance with a given range of parameter values for each parameter, the given range of parameter values including the plurality of potential parameter values of the corresponding parameter, the plurality of potential parameter values selected based on a distribution of previous parameter values associated with one or more of previous prediction models.

12. The method of claim 10, wherein the time series prediction model is performed in real-time.

13. The method of claim 10, wherein the time series prediction model comprises the ARIMA prediction model or autoregressive moving average model (ARMA).

14. The method of claim 10, wherein the time series prediction model comprises a moving average model.

15. The method of claim 10, wherein selecting the parameter value set associated with the least relative amount of prediction error comprises comparing the prediction value with a corresponding observed time series data.

16. A system comprising:
one or more processors; and
one or more computer storage media storing computer-useable instructions that, when used by the one or more processors, cause the one or more processors to:
identify a predetermined number of parameter value sets, each parameter value set having parameter values that represent corresponding parameters for inputting as a combination to define a function in an autoregressive integrated moving average (ARIMA) prediction model, wherein the parameter values indicate one of a number of differencing terms or an order of differencing terms to use in the corresponding function of the ARIMA predication model, and an indication of a previous number of web page views, each parameter value within each parameter value set is selected by:
selecting a value from one of a plurality of strata, for a corresponding parameter, based on probabilities associated with each strata of the plurality of strata for the corresponding parameter, wherein each strata of the plurality of strata for the corresponding parameter includes a subportion of a plurality of potential parameter values for the corresponding parameter and the strata is associated with a corresponding probability, used to select the value, determined based on a distribution of previously selected parameter values for previous prediction models;

receiving a first portion of the observed time series data set from a data collection center with data describing web traffic;

in a first iteration, implement each identified parameter value set into the corresponding ARIMA prediction model and use the first portion of the observed time series data set to generate a predicted value associated with each parameter value set;

compare the predicted value associated with each parameter value set to a second portion of the observed time series data set that corresponds with the predicted value to generate a first relative prediction error for each parameter value set, wherein the first portion does not overlap with the second portion;

in a second iteration, implement each identified parameter value set into the corresponding ARIMA prediction model and use a third portion of the observed time series data set to generate a new predicted value associated with each parameter value set, wherein the third portion partially overlaps with the second portion;

compare the new predicted value associated with each parameter value set to a fourth portion of the observed time series data set that corresponds with the predicted value to generate a second relative prediction error for each parameter value set, wherein the fourth portion does not overlap with the third portion;

select a parameter value set associated with a least relative prediction error, from the first and the second relative prediction errors for each parameter value set, for generating a time series prediction model;

implement the selected parameter value set into the ARIMA prediction model to generate the time series prediction model; and use the time series prediction model to predict values expected to occur at a later time.

17. The system of claim 16, wherein the time series prediction model is performed in real-time.

18. The system of claim 16, wherein the time series prediction model comprises the ARIMA prediction model or autoregressive moving average model (ARMA).

19. The system of claim 16, wherein the time series prediction model comprises a moving average model.

20. The system of claim 16, wherein the time series prediction model comprises an autoregressive model.

* * * * *

UNITED STATES PATENT AND TRADEMARK OFFICE
CERTIFICATE OF CORRECTION

| | | |
|---|---|---|
| PATENT NO. | : 11,443,015 B2 | Page 1 of 1 |
| APPLICATION NO. | : 14/919395 | |
| DATED | : September 13, 2022 | |
| INVENTOR(S) | : Kourosh Modarresi | |

It is certified that error appears in the above-identified patent and that said Letters Patent is hereby corrected as shown below:

In the Claims

Claim 7, Column 17, Line 18:
The line reading "least relative of prediction error comprises comparing the" should read -- least relative prediction error comprises comparing the --.

Signed and Sealed this
Eighth Day of November, 2022

Katherine Kelly Vidal
*Director of the United States Patent and Trademark Office*